Patented Aug. 13, 1940

2,211,745

UNITED STATES PATENT OFFICE 2,211,745

COMPOUND OF ALUMINUM HYDROXIDE AND PROCESS OF MAKING THE SAME

Kennard F. Stephenson, Loudonville, N. Y., assignor to Alba Pharmaceutical Company, Inc., New York, N. Y., a corporation of New York No Drawing. Application April 18, 1940, Serial No. 330,309

6 Claims. (Cl. 252—189)

This invention relates to a process for dehydrating aluminum hydroxide suspension (cream of aluminum) in such a manner as to preserve in the dry aluminum hydroxide $(Al(OH)_3)$ the acid neutralizing value of the colloidal product.

This invention includes also as a new product, the dried aluminum hydroxide compound so obtained.

Colloidal aluminum hydroxide as commonly met with in the pharmaceutical trade is a colloidal suspension of aluminum hydroxide in water. It is used internally in regulating the acidity of the stomach. The water content of the commercial product is usually about 94%. This high content of water renders the product susceptible to temperatures below the freezing point and causes unnecessary weight and volume in storing and handling of the product. The colloidal product is not easy to dispense in uniform doses and further causes an irritating, astringent action on the mucous membrances of the mouth and throat even when administered in water.

Previous attempts to prepare a dried aluminum hydroxide which retained the acid neutralizing quality of the colloidal product have been completely unsuccessful and have resulted in products which had practically no reaction with the stomach acid. Powdered aluminum hydroxide is referred to in the 1905 and 1909 issues of the National Standard Dispensatory. In the 19th, 20th, 21st and 22nd editions of the Dispensatory, however, no mention is made of the powdered product, nor is any mention made of powdered aluminum hydroxide in issues X or XI of the U. S. Pharmacopoeia. As a matter of fact, aluminum hydroxide powder, when prepared in accordance with methods heretofore known, possesses practically no acid neutralizing power under mild conditions such as those encountered in the human alimentary tract. Merck's Index describes aluminum hydroxide powder as "soluble in boiling hydrochloric and sulphuric acids." The clear inference from this statement is that the acid neutralizing power of the prior art powdered product under mild conditions is negligible, which, in fact, is the case.

I have now found that if a colloidal suspension of aluminum hydroxide is dehydrated in the presence of at least 20% of a carbohydrate, a dry product possessing a high and rapid acid neutralizing power under mild conditions is obtained. The removal of water is preferably accomplished with the aid of a vacuum. As examples of carbohydrates which may be employed I may mention can sugar, dextrine, starch, gum acacia, sorbitol, and gum tragacanth. One of the preferred carbohydrates which I use is cane sugar. Very good results, however, can be obtained with other carbohydrates.

I may evaporate a mixture containing about 20 or 30% carbohydrate and about 80 or 70% aluminum hydroxide and thereby obtain dry products possessing very superior qualities. I prefer to employ at least 50% carbohydrate in my compositions and have found that compositions containing about ⅔ carbohydrate and ⅓ aluminum hydroxide are the most satisfactory.

A preferred form of my invention consists in the mixing of commercial aluminum hydroxide with cane sugar and removing the water by means of heating, preferably under vacuum. The proportions of carbohydrate and aluminum hydroxide are such that the resulting dried product shall contain approximately ⅓ aluminum hydroxide $(Al(OH)_3)$ and ⅔ carbohydrates, more or less. The resulting dried product may be then ground or milled and the resulting product is suitable for compounding into powders or compressing into tablets after the addition of suitable media. Certain changes in carrying out the above process may be made without departing from the scope of the invention, and it is intended that the above description shall be interpreted as an illustration and not in a limiting sense.

Drying may be accomplished, for example, by subjecting a mixture of approximately 6% aluminum hydroxide, 83% water and 11% sugar to a temperature between 50–70° C. and a vacuum of 25–30 inches. The temperature for drying is preferably not above 70° C. because of discoloration and not below 50° C. for speed of operation.

I may also precipitate aluminum hydroxide from aluminum salts in the presence of carbohydrates, but in this case care must be taken that not too much carbohydrate is lost in washing out the salts formed during precipitation, and there must always be present during the drying of the aluminum hydroxide at least 20% carbohydrate. Carbohydrate lost during the washing step should of course be replaced before drying.

The aluminum hydroxide products now here first described neutralize N/10 acid practically as quickly and practically as theoretically in quantities as an equivalent amount of aluminum hydroxide in colloidal suspension. When compressed into tablets, they have the advantage of exact dosage, of stability at any temperature and convenience in handling and dispensing. The tablets may be flavored and otherwise made more acceptable to the patient than is the colloidal product.

Examples of the neutralizing action of aluminum hydroxide carbohydrate powder on N/10 HCl compared to the neutralizing power of colloidal aluminum hydroxide and also to that of dried aluminum hydroxide alone are given in the following table.

The following figures illustrate the time required (in minutes) for 0.1 gram of aluminum hydroxide $Al(OH)_3$ or of carbohydrate-aluminum hydroxide mixtures containing 0.1 gram of aluminum hydroxide to neutralize certain volumes of N/10 hydrochloric acid at 37° C., using Congo Red as indicator.

Theoretically 0.1 gram Al(OH)$_3$ will neutralize 39 cc. N/10 HCl.

| Number of cc. N/10 HCl | 0.5 | 2.0 | 5.0 | 20.0 | 30.0 | 36.0 |
|---|---|---|---|---|---|---|
|  | Time in minutes |  |  |  |  |  |
| Al(OH)$_3$ U. S. P. IX powder | Not in 16 hrs | Not in 16 hrs |  |  |  |  |
| Al(OH)$_3$ gel |  |  | At once | 3 | 10 | 15. |
| Al(OH)$_3$ dried 50° C |  |  | 25 | 200 | 300 |  |
| Al(OH)$_3$ vac. dried 65° C |  |  | 30 | Not in 30 hrs |  |  |
| 67% sugar / 33% Al(OH)$_3$ } vacuum evaporation |  |  | At once | 4 | 14 | 28. |
| 50% sugar / 50% Al(OH)$_3$ } vacuum evaporation |  |  |  | 6 | 25 |  |
| 67% sorbitol / 33% Al(OH)$_3$ } vacuum evaporation |  | At once | At once | 3 | 5 | 20. |
| 67% dextrose / 33% Al(OH)$_3$ } vacuum evaporation |  | do | do | 4 | 16 |  |
| 67% milk sugar / 33% Al(OH)$_3$ } vacuum evaporation |  | do | do | 4 | 17 |  |
| 67% starch / 33% Al(OH)$_3$ } vacuum evaporation |  | do | do | 3 | 13 | 39 |
| 67% swollen starch / 33% Al(OH)$_3$ } vacuum evaporation |  | do | 1 | 9 | 18 | 47. |
| 67% dextrin / 33% Al(OH)$_3$ } vacuum evaporation |  | do | At once | 6 | 12 | 30. |
| 67% tragacanth / 33% Al(OH)$_3$ } vacuum evaporation |  | do | do | 6 | 22 | 57. |
| 67% acacia / 33% Al(OH)$_3$ } vacuum evaporation |  | do | do | 6 | 13 | 40. |
| 33% sucrose / 33% swollen starch } vacuum evaporation |  | do | do | 3 | 13 | 30. |

The effects obtained by using different concentrations of two representative carbohydrates, i. e. starch and sugar, are illustrated by the following table.

| Each sample contains 0.100 gram Al(OH)$_3$ | Cc. N/10 HCl at 37° C. | | | | | |
|---|---|---|---|---|---|---|
|  | 5 | 10 | 15 | 20 | 30 | 36 |
| 80 parts Al(OH)$_3$—20 starch | 4 min | 11 min | 24 min | 1¼ hrs | 2¾ hrs | Not in 24 hrs. |
| 80 parts Al(OH)$_3$—20 sugar | 3 min | 8 min | 18 min | 1 hr | 4 hrs | Do. |
| 70 parts Al(OH)$_3$—30 starch | 3 min | 7 min | 16 min | 1¼ hrs | 2¼ hrs | Do. |
| 70 parts Al(OH)$_3$—30 sugar | 2 min | 5 min | 9 min | 24 min | 2 hrs | Do. |
| 60 parts Al(OH)$_3$—40 starch | 2 min | 7½ min | 12 min | 31 min | 1¼ hrs | Do. |
| 60 parts Al(OH)$_3$—40 sugar | 2½ min | 6 min | 8 min | 14 min | 1¾ hrs | Do. |
| 50 parts Al(OH)$_3$—50 starch | 3 min | 8 min | 11½ min | 30 min | 1 hr | Do. |
| 50 parts Al(OH)$_3$—50 sugar | 1½ min | 3 min | 4½ min | 6 min | 25 min | Do. |
| 33 parts Al(OH)$_3$—67 starch | 3 min | 5 min | 8 min | 13 min | 39 min | 47 min. |
| 33 parts Al(OH)$_3$—67 sugar | At once | ¼ min | 2½ min | 4 min | 14 min | 28 min. |

It has been proposed to prepare a reversible magnesium hydroxide by evaporating an aqueous suspension of magnesium hydroxide in the presence of sugar. Such drying of magnesium hydroxide in the presence of sugar serves to maintain the original particle size of the magnesium hydroxide.

Aluminum hydroxide presents quite a different problem and exhibits quite different results in that aluminum hydroxide dried in the presence of sugar or other carbohydrate is not reversible and does not possess its original colloidal characteristics. The acid neutralizing power of aluminum hydroxide powder so obtained is, surprisingly, however, substantially equal to the original colloid from which it is obtained.

This application is in part a continuation of my prior application Serial No. 274,371, filed May 18, 1939. The term "colloidal aluminum hydroxide" as used herein identifies an aluminum hydroxide of the type obtainable by precipitation of such hydroxide from an aqueous solution of an aluminum salt with ammonia followed by removal of water-soluble salts by washing and removal of surplus water by decantation, if desired.

Having described my invention, what I claim as new and desire to secure by Letters Patent is:

1. The process which comprises evaporating to substantial dryness an aqueous suspension of a carbohydrate and colloidal aluminum hydroxide, the ratio of said carbohydrate and aluminum hydroxide being at least one fourth.

2. A composition containing a carbohydrate and colloidal aluminum hydroxide in a ratio of at least one fourth obtained by evaporating an aqueous suspension containing said carbohydrate and colloidal hydroxide in said ratio.

3. The process which comprises evaporating to substantial dryness an aqueous suspension of a carbohydrate and colloidal aluminum hydroxide, the ratio of said carbohydrate and aluminum hydroxide being at least one.

4. A composition containing a carbohydrate and colloidal aluminum hydroxide in a ratio of at least one obtained by evaporating an aqueous suspension containing said carbohydrate and colloidal aluminum hydroxide in said ratio.

5. The process which comprises evaporating to substantial dryness an aqueous suspension of a carbohydrate and colloidal aluminum hydroxide, the ratio of said carbohydrate and aluminum hydroxide being at least two.

6. A composition containing a carbohydrate and colloidal aluminum hydroxide in a ratio of at least two obtained by evaporating an aqueous suspension containing said carbohydrate and colloidal aluminum hydroxide in said ratio.

KENNARD F. STEPHENSON.